March 18, 1924.

W. J. MOORE 1,486,913

COMBINED TRIP BUMPER AND COLLISION SCREEN FOR AUTOMOBILES

Original Filed Feb. 6, 1922   2 Sheets-Sheet 1

WITNESSES
Geo W Naylor
Robert J. Hulsizer

INVENTOR
WALTER J. MOORE
BY
ATTORNEYS

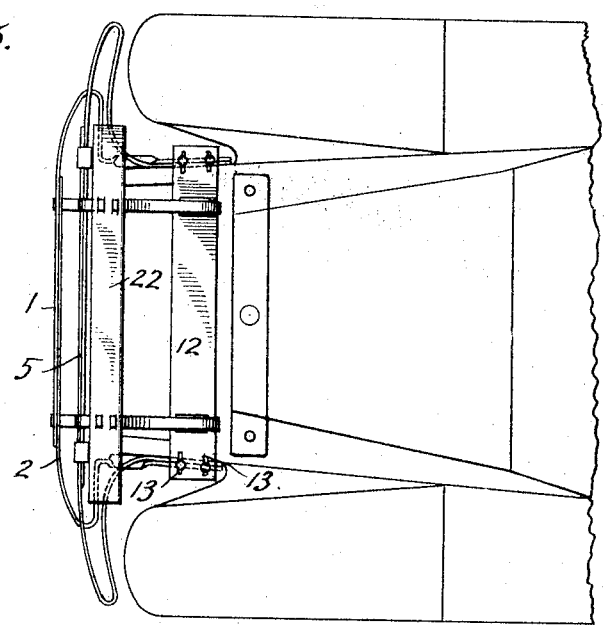
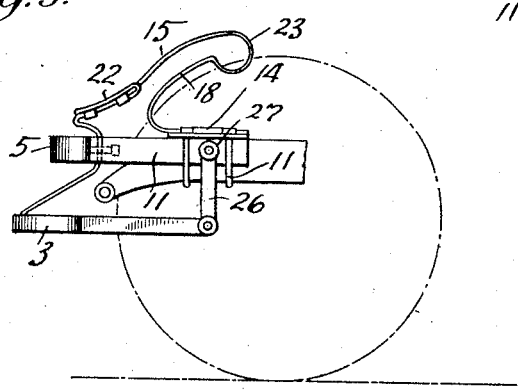
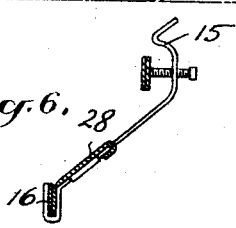

Patented Mar. 18, 1924.

1,486,913

UNITED STATES PATENT OFFICE.

WALTER J. MOORE, OF NEW YORK, N. Y.

COMBINED TRIP BUMPER AND COLLISION SCREEN FOR AUTOMOBILES.

Application filed February 6, 1922, Serial No. 534,500. Renewed September 11, 1923.

*To all whom it may concern:*

Be it known that I, WALTER J. MOORE, a citizen of the United States, and a resident of the city of New York, borough of Manhattan, in the county and State of New York, have invented a new and Improved Combined Trip Bumper and Collision Screen for Automobiles, of which the following is a full, clear, and exact description.

This invention relates to a combined trip bumper and collision screen for automobiles, and has for an object the provision of means whereby a person struck by an automobile is effectively tripped so that instead of being thrown forward and run over by the automobile he is caused to fall backward into and against the collision screen forming the subject matter of my copending application, Serial No. 505,835, filed October 6, 1921, entitled Collision screen.

Another object resides in the provision of a trip bumper which is especially adapted for cars having either no bumpers at all or bumpers which are mounted rather high on the front of the car.

A further object resides in the provision of a trip bumper which will effectively cause a tripping of the person struck but is resiliently mounted so that the tripping will not result in injury to the person so tripped.

A still further object resides in the provision of a construction whereby the person struck by the trip bumper will be inclined to be received and supported on the front of the car in a sitting position.

Another object resides in the provision of means whereby any person, regardless of his size, will be prevented from getting beneath the car whereby severe injury might result.

A further object resides in the particular construction and arrangement of parts which are hereinafter described and claimed and shown in the accompanying drawings.

The invention is illustrated in the drawings, of which—

Fig. 3 is a plan view of the trip bumper construction.

Fig. 4 is a section showing the manner in which the trip bumper is connected to the frame of the automobile.

Fig. 5 is a side view of a modified form of mounting the trip bumper on the front of a car.

Fig. 6 is a section of a further modification.

Figure 1:
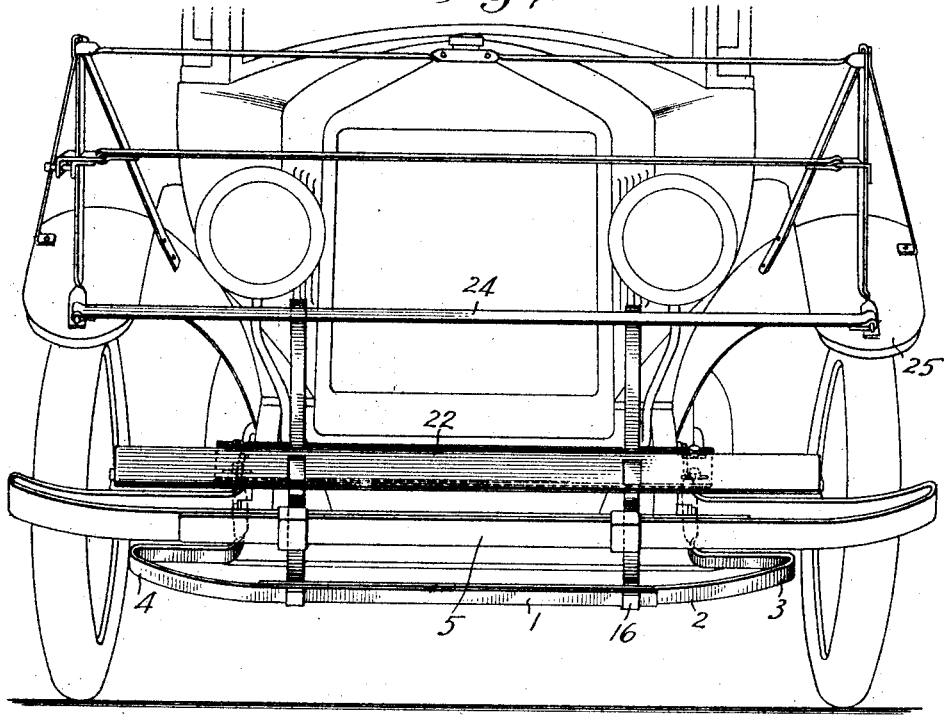
Figure 1 is a front elevation of an automobile with the trip bumper mechanism and the collision screen attached.

The form of the invention shown in the drawings is a preferred form, although it is understood that modifications in the construction and arrangement of the parts and in the character of the materials used may be adopted without departing from the spirit of the invention.

The device shown in the drawings, which is a preferred application of the invention to a car having a high bumper of the usual type, is for the purpose of effectively tripping a person struck by an automobile while making contact with the calf of the leg or the part of the limb below the knee. The high bumper would tend to throw a person to the pavement, if it were the first part of the automobile hitting him; and a low bumper, such as that used in accordance with my invention, would tend to trip him, thus allowing the collision screen with which this trip bumper is used to receive the impact and prevent the dead blow which would be received by impact either with the pavement or with the radiator or lamps on the front of the car. The initial blow would be received on a point very much below the center of gravity, would be made by a yieldable or spring cushion device, and the direct contact would be made, preferably, by yielding material, such as spring straps. The device is so designed that it will ordinarily be forced back out of the way when a heavy force is encountered so that the main bumper could receive the main force of a heavy blow. The trip bumper should move back to avoid receiving extra heavy impacts for the reasons above set forth and is, accordingly, suspended in a plane below the plane of the usual bumper and below the plane of the frame of the car, which is the natural plane for receiving the heavy impact of a collision.

The invention comprises a trip bumper made preferably of flat, strong steel straps or plates such as 1 and 2, which are crossed in any desired manner to allow for adjustment and the widths of various cars, and the ends of which are clamped together in the usual manner. The free ends of these straps are curved back, as at 3 and 4, in a smooth curve under the usual bumper 5. These curved ends are necessary because the tendency of an automobile passing another at approximately 90° in the traffic would be to catch on any projecting surface which was not rounded and which did not have the ends curved well under the standard bumper. This curvature is also provided to cause the bumper plates to clear the arc of movement of the wheel. Each of the ends of the trip bumper is then slightly bent horizontally, as at 6, Fig. 2, toward the front of the car to increase the resiliency of the bumper, and thence are bent up as at 7 to a point adjacent the channel or chassis bar 8, where they are then bent as at 9 to dispose them parallel to the frame of the automobile. The rear ends of the trip bumper may, however, as shown in Fig. 5 and described hereinafter more in detail, be connected to a pivoted arm dropped from the chassis or frame member of the automobile.

As shown particularly in Fig. 4, the frame member 8 of the automobile may be a channel bar, and as is usually the custom, the main bumper plate 10 is disposed flat against this frame member. Preferably the ends of the trip bumper plates are disposed flat against the main bumper plate, and these two plates are held against the channel member 8 by means of the usual shackle bolt 11 which at one end engages with a part of the frame member 8 and at the other end is adjusted to engage with a supporting plate to be hereinafter described.

Extending across between the chassis frame members 8 in front of the radiator, preferably, is a plate or platform 12. If the chassis frame members do not extend in front of the radiator, this platform may be mounted on the shanks of the standard bumper. This platform is provided with slots such as 13 to receive the ends of the shackle bolts previously mentioned and also to receive the ends 14 of two heavy straps or strips such as 15 of flat steel spring material which act at their other ends as supports for the central portions of the trip bumper plates 1 and 2 and also to take up any shock received on the bumper plates, as well as to function as the elements which allow the trip or sub-bumper to move back when the stroke is more than necessary to trip a person.

Figure 2:
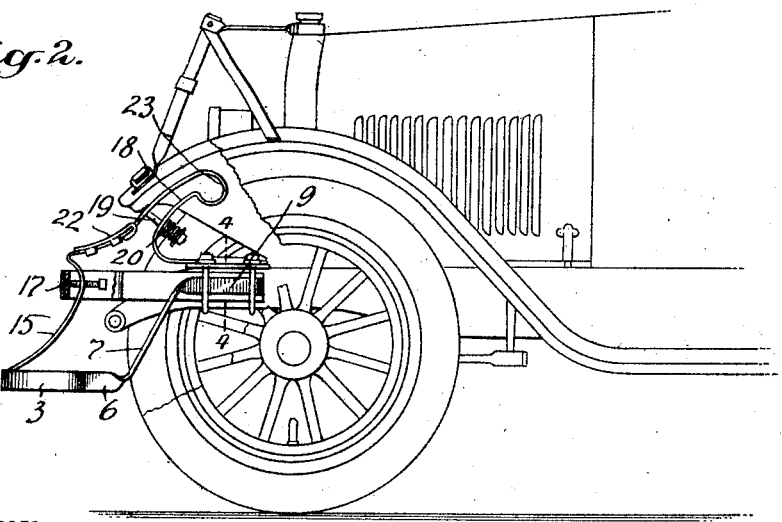
Fig. 2 is a side elevation of the front of the automobile.

As shown in Figs. 1, 2 and 3 particularly, the lower forward end of each of these straps 15 is bent as at 16 to clamp the bumper plates 1 and 2. Each of these straps then passes upward back of the usual bumper plate and may be spaced therefrom by any suitable device, such as an adjustable screw 17. Above the main bumper each of the straps extend upwardly and rearwardly in a smooth curve, and then are bent reversely as at 18 to parallel the portion just mentioned throughout a part of its length. These two parallel portions may be connected by a bolt 19 which engages one parallel portion and is connected resiliently by a spring 20 with the other parallel portion, so that these portions may give with respect to each other and further enhance the resiliency of the bumper. The rear end of each strip 15 is then bent in a horizontal rearward manner to pass under struck-up ear portions such as 21 on the plate or platform 12, as previously mentioned.

A flat plate or surface 22 of any suitable material, preferably metal, is received on and supported by the straps 15 extending across from one strap to another at a point just above and to the rear of the main bumper 5; this surface 22 being supported on the springs or straps 15 is adapted to receive the seat or the thigh of the person struck and furnish a yielding contact because of its resilient mounting. The springs or straps 15, when they are bent in the reverse manner previously mentioned, have formed therein a loop 23 whereby the tension or resiliency of the straps is increased. The use of the spring 20 and the bolt with which it co-operates as previously described is optional but is intended to increase the springy effect and allow adjustment on those cars where there is limited space and the device would have to be reduced in size to a considerable extent and in which additional springy effects would be necessary.

This device, the preferred form of which has been thus described, is, of course, preferably adapted to be used in connection with the collision screen referred to as forming the subject matter of my co-pending application. This trip bumper in connection with the collision screen forms a complete fender for an automobile, which does not obstruct the vision of the driver and does not extend beyond the usual equipment of the car more than two or three inches on a low car where the chassis bumper would be but slightly below the usual bumper; and on high cars it would be approximately five to six inches forward, and about eight to ten inches below, the usual bumper. The plate 22 would preferably be slightly forward of the plane of the collision straps of the collision screen at its lower end and dip forwardly and rearwardly at a suitable supporting angle, as shown. The general relation of the trip bumper, main bumper, plate or supporting seat 22 and the collision straps such as 24 is such that when a person is tripped these elements are in line extending upwardly and rearwardly at a definite angle, the tendency of the parts being to support the person struck and the device generally giving the person something to grasp to keep from falling. It will be noted that the lower collision strap 24 is connected across between the mudguards 25 in a manner indicated in the above-mentioned application.

In the modification shown in Fig. 5, the rear ends of the bumper straps or plates 1 and 2 extend rearwardly and are suitably engaged with a pivoted arm 26 dropped from the chassis frame member 8 to which they are pivoted in any desired manner at the point 27. This pivoted arm 26 will move rearwardly whenever the bumper is struck to provide the yielding effect above mentioned.

In Fig. 6 I show a plate 28 extending across between the straps 15 and connected to them at a point slightly above the trip bumper and below the main bumper so that a person, such as a small child, if struck by the trip bumper would not be inclined to pass between the main bumper and the trip bumper and thereby be liable to injury beneath the car. This supporting or obstructing plate is connected to the straps in any desired manner. It also acts to prevent another object, such as a car, from catching on to the bumper.

It will thus be seen that I have provided a trip bumper which is effectively combined and co-operates with a collision screen to form a complete fending device for the front of a car. This apparatus can be applied by suitable adjustments to any type of car and does not interfere with the vision of the driver. Furthermore, it takes up very little space forward of the car and does not in any way project beyond a very short distance from the front.

The tendency of this apparatus is to strike a person a light, cushioned blow at a point low on the body, preferably between the knees and the feet, so that the person tripped, and at the instant of being tripped, is substantially supported throughout his length on the apparatus, so that the body of the person struck travels practically no distance before it is entirely supported. In this way, injury to the person is substantially eliminated.

The device can be made of simple stock material and, consequently, can be manufactured in an economical manner. The trip bumper need not, of course, be used in connection with cars where the usual bumper is hung low but is especially adapted for cars in which the bumpers are disposed rather high, to produce the desired contact.

What I claim is:

1. The combination of an automobile with a trip bumper disposed across an end of the automobile at a level to trip a person struck by the bumper and a collision bumper disposed across the end of the vehicle at which the said trip bumper is disposed.

2. The combination with an automobile of a trip bumper resiliently supported across an end of the automobile at a level to trip a person struck by the bumper and a collision bumper disposed across the end of the vehicle at which the said trip bumper is disposed.

3. The combination with an automobile of a collision screen supported across an end of the automobile and a trip bumper supported across this end of the automobile at a level to trip a person truck by the bumper whereby they may be received on the collision screen instead of being thrown to the ground and a collision bumper across the end of the automobile at which said screen and trip bumper are disposed.

4. The combination with an automobile of a collision screen disposed across an end of the automobile in front of the radiator and the lamps, and a trip bumper supported across this end at a level to contact with the limb of a person struck by the bumper at a point between the knee and the ground whereby the person may be effectively tripped against the collision screen instead of being thrown to the ground and a collision bumper across the end of the automobile at which said screen and trip bumper are disposed.

5. A trip bumper for an automobile, supported across an end thereof, which comprises a strip of flexible material disposed across the front of the automobile at a level to contact with a person between his knee and the ground, the ends of the strip being curved back to provide a resilient semi-loop, and means for fastening the ends to the frame of the automobile and a collision screen disposed across the front of the automobile.

6. A trip bumper for an automobile, supported across an end thereof, which comprises a strip of flexible material disposed across the front of the automobile at a level to contact with a person between his knee and the ground, the ends of the strip being curved back to provide a resilient semi-loop, and means for resiliently supporting these ends and a collision screen disposed across the front of the automobile.

7. A trip bumper for automobiles, which comprises a strip of flexible material disposed across the front of the automobile at a level to trip the person struck thereby, the ends of the strip being turned in a smooth curve to provide a resilient semi-loop, and a pivoted arm depending from each side of the frame of the automobile and connected to the free ends of the strip to flexibly support the same.

8. A trip bumper for automobiles having the usual bumper and frame members extending in front of the radiator, which comprises a strip of flexible material disposed across in front of the automobile at a level below the main bumper and slightly forward of the same, the free ends of the strip being looped back on themselves and connected to the frame member, and a plurality of flexible strips of spring material connected at one end to the bumper strip intermediate its length to support the same, the spring material being connected at its other end to the frame member.

9. A trip bumper for automobiles having the usual bumper and frame members extending in front of the radiator, which comprises a strip of flexible material disposed across in front of the automobile at a level below the main bumper and slightly forward of the same, the free ends of the strip being looped back on themselves and connected to the frame member, and a plurality of flexible strips of spring material connected at one end to the bumper strip intermediate its length to support the same, the spring material being connected at its other end to the frame member and to the main bumper member at an intermediate point.

10. A trip bumper arrangement for automobiles having a main bumper extending in front of the radiator, which comprises a strip of flexible material disposed across the front of the automobile at a level below that of the main bumper and slightly forward thereof, the free ends of the strip being turned back on themselves and flexibly connected to the frame of the automobile, a plurality of strips of springlike material connected at one end to the trip bumper intermediate its length to support the same adjustably connected to the main bumper intermediate their lengths, and a plate extending across between the said bars of the main bumper to which the other ends of the springlike strips are connected.

11. A trip bumper arrangement for automobiles having a main bumper extending in front of the radiator, which comprises a strip of flexible material disposed across the front of the automobile at a level below that of the main bumper and slightly forward thereof, the free ends of the strip being turned back on themselves and flexibly connected to the frame of the automobile, a plurality of strips of springlike material connected at one end to the trip bumper intermediate its length to support the same adjustably connected to the main bumper intermediate their lengths, and a plate extending across between the side bars of the main bumper to which the other ends of the springlike strips are connected, these springlike strips having throughout their length smooth curved portions to provide a sufficient spring action whereby the trip bumper will give sufficiently when a person is tripped thereby.

12. A bumper arrangement for automobiles, which comprises a strip of resilient material disposed across in front of the automobile in a substantially horizontal plane, a plurality of substantially vertically disposed supporting spring members connected at one end to the strip of flexible material and at the other end to the frame of the automobile, and a supporting plate or surface connected across between the strips of spring material to receive the seat of a person tripped by the bumper.

13. The combination of a collision screen disposed in front of an automobile with a trip bumper flexibly supported from the frame of the automobile at a level to trip a person struck thereby, and a seat supporting surface mounted in association with the screen and the bumper to receive the seat of the person so tripped.

14. The combination with an automobile of a trip bumper disposed at the forward end thereof, a collision bumper also disposed at the forward end of the automobile, a seat for receiving the body of a person tripped and a collision screen adapted to prevent the person tripped from coming against the forward end of the automobile, all of said parts being located rearwardly of a vertical plane through the front portion of the trip bumper.

15. The combination with an automobile of a trip bumper disposed at the forward end thereof, a collision bumper also disposed at the forward end of the automobile, a collision screen adapted to prevent the person tripped from coming against the forward end of the automobile, all of said parts being located rearwardly of a vertical plane through the front portion of the trip bumper.

16. The combination with an automobile of a collision bumper at the forward end of the automobile, a trip bumper mounted forwardly of said collision bumper and a collision screen adapted to receive persons tripped, said collision bumper being forward of said screen.

17. The combination with an automobile of a collision bumper at the forward end of the automobile, a trip bumper mounted below said collision bumper and a collision screen adapted to receive persons tripped, said collision bumper being forward of said screen.

18. The combination with an automobile of a collision bumper at the forward end of the automobile, a trip bumper mounted forward and below said collision bumper and a collision screen adapted to receive persons tripped, said collision bumper being forward of said screen.

19. The combination with an automobile, of a collision bumper at the forward end thereof, a trip bumper forwardly of said collision bumper and a collision screen adapted to receive a person tripped, said trip bumper being resiliently mounted whereby it may be forced backwardly without injury to permit the collision bumper to receive the shock, said collision bumper being forward of said screen.

20. The combination with an automobile of a collision bumper disposed at the forward end thereof, a trip bumper also at said forward end and a collision screen at said forward end adapted to receive persons tripped, the forward portion of said trip bumper comprising overlapping ends secured together at a plurality of points.

21. The combination of a collision bumper, a collision screen disposed in front of an automobile, a trip bumper flexibly supported from the frame of the automobile at a level to trip a person struck thereby and seat supporting surfaces mounted in association with the screen and the trip bumper to receive the seat of the person so tripped.

22. The combination with a vehicle, of a collision bumper at substantially the level of the frame of the vehicle, a trip bumper below said collision bumper and a protective device adapted to receive the body of a person struck, both of said bumpers being forward of said device.

23. The combination with an automobile of a collision bumper secured thereto, of a trip bumper below said collision bumper and means for supporting said trip bumper comprising a reflexed member secured to said automobile and extending upwardly from its point of support and then downwardly below said collision bumper to said trip bumper.

24. The combination with an automobile of a collision bumper secured thereto, of a trip bumper below and forward of said collision bumper and means for supporting said trip bumper comprising a reflexed member secured to said automobile and extending upwardly from its point of support and then downwardly below said collision bumper to said trip bumper.

WALTER J. MOORE.